United States Patent Office 3,025,252
Patented Mar. 13, 1962

3,025,252
INCORPORATION OF METALLIC PIGMENT
IN COATING COMPOSITIONS
Stanton E. Jack, Kingston, Ontario, Canada, assignor to Aluminium Laboratories Limited, Montreal, Quebec, Canada, a corporation of Canada
No Drawing. Filed Apr. 3, 1958, Ser. No. 726,033
31 Claims. (Cl. 260—23)

This invention relates to coating compositions containing metallic pigments and more particularly it relates to the incorporation of aluminum pigments in coating compositions which comprise an aqueous dispersion of a film-forming agent.

In general, difficulty has been encountered in incorporating aluminum pigments in water-dispersion type coating compositions because of the fact that the so-called wetting agents which have been believed necessary to enable the dispersion of the metal pigment in the aqueous vehicle, e.g., in the aqueous dispersion of a film-forming agent, lower the water resistance of the ultimate coating film, producing a coating which is unsatisfactory with regard to water resistance, scuff resistance, and the like, and in some instances with regard to appearance.

It will be understood that metallic aluminum pigments are conventionally produced in paste form, i.e. being a paste which is an intimate mixture of the metal powder or pigment itself with a hydrocarbon solvent such as mineral spirits, solvent naphtha, turpentine or the like. Most commonly, so-called leafing pigments are produced by grinding the aluminum powder in the presence of a fatty acid such as stearic acid, so that the resulting pigment paste also contains the fatty acid, usually or chiefly as a coating on the individual metal particles or flakes. Aluminum pigment pastes are a well known article of commerce and have for most purposes replaced the previously used dry aluminum pigments. As will be understood, they are readily incorporated in oil-base coating compositions of the nature of paints, inks or the like.

Serious problem arises, however, in the incorporation of metallic pigments into water-dispersion compositions, especially in obtaining an effective dispersion of the pigment, as supplied in the described paste form, into the aqueous medium. It is important not only to avoid introducing agents which reduce the water resistance of the ultimate coating but also to maintain the essentially aqueous character of the coating composition so that it will have the desirable characteristics of such materials. That is to say, an important feature of these water-base coating preparations, whether used as paints or for other coating purposes, is that they can be diluted with water and that the cleaning of brushes, rollers or other instruments for applying them can be effectuated with water or water solutions of simple detergents.

The present invention is predicated on the discovery that by the utilization of an oil-soluble surface-active agent which is relatively insoluble in water, with a so-called coupling agent and material providing a fatty acid soap of a volatile base, aluminum pigments or powders, especially as produced in admixture with hydrocarbon solvents, can be effectively dispersed in the described aqueous-base coating materials, to yield coating compositions which are convenient to use and which have good qualities of permanence and durability, with the desired metallic pigmentation. It has also been found that by so constituting the composition, with the inclusion of organic solvent material, as originally present in the aluminum paste and preferably as additionally included for convenience in preparation, the resulting mixture comprises an oil-in-water emulsion, a further discovery being that the attainment of such emulsion is of special significance to maintain the above-described aqueous characteristics of the paint or other coating composition.

Thus by the conjoint function of the substantially water-insoluble surface-active agent, the coupling agent and the described auxiliary emulsifying agent, an effective dispersion of the aluminum powder is obtained in a coating composition which comprises a water emulsion or other dispersion of a water-insoluble film-forming agent. The resulting preparation comprises water in a continuous phase having both the film-forming agent and the aluminum powder uniformly dispersed or suspended therein, as likewise the organic liquid, e.g. mineral spirits or other hydrocarbon solvent, the latter being present as an oil-in-water emulsion and the particles of metal powder being presumably held by the dispersed particles or droplets of the oil phase.

While it may theoretically appear that aluminum pigment could be incorporated in aqueous-dispersion coating compositions by establishing a water-in-oil emulsion, it is found that such products lack many desirable properties of this type of coating material. They cannot be thinned with water; on the contrary, addition of water, if dispersible at all, appears to have a thickening effect on the mixture. Furthermore it is impossible to wash or clean the composition away from brushes, applicators, containing vessels or other surfaces, with water or simple aqueous media. In contrast, the present compositions, embodying the oil-in-water emulsion, avoid all of these difficulties, yet in drying after application, provide an effectively bound coating of aluminum pigment. In the course of drying, the emulsion breaks, perhaps after first inverting to a water-in-oil form; in any event the composition then functions to achieve an adherent, highly durable coating of the metal flakes. Where the nature of composition and the circumstances of use are specifically designed to permit leafing of the aluminum, satisfactory leafing action can also be achieved if desired.

As also indicated, a further and particularly desirable characteristic of the present compositions is that they are not water-sensitive after drying. That is to say, there do not remain any water-soluble or similar substances which would impair the resistance of the film to water. The surface-active agent is essentially water-insoluble, yet in combination with the other substances noted, it is effective to promote the desired emulsion of the oil or hydrocarbon content as well as the dispersion of the metallic particles. The coupling agent is effectively volatile, so that it does not remain in the dried coating, while the auxiliary emulsifying agent, being a soap of a volatile base, reverts to a substantially insoluble fatty acid. The last-mentioned agent is conveniently incorporated by adding ammonia, i.e. as ammonium hydroxide, for reaction with stearic acid or other fatty acid, which may at least in part be already present in the metallic pigment paste, to yield a fatty acid salt of ammonia, e.g. ammonium stearate, it being understood that equivalent ammonia material such as ammonia derivatives may be employed. Thus as finally prepared, the coating composition contains an ammonium soap, but upon drying of the composition after application, the ammonia constituent is removed, i.e. in that the defined soap decomposes by volatilization of such ammonia or equivalent constituent, to leave the essentially water-insoluble fatty acid. The hydrocarbon solvent itself also volatilizes when the applied coating dries, as likewise the water in which the various components are emulsified or dispersed. Hence the coating does not tend to dissolve, soften or otherwise become weakened by subsequent contact with water, and it provides an effectively water-resistant finish with the metal particles securely retained.

The present improvements are applicable to the incorporation of aluminum pigment, i.e. comprising flaked metallic aluminum powder, in a variety of water-dispersed coating compositions, which involve one or more film-forming agents of essentially water-insoluble character disposed in uniform suspension in water or equivalent aqueous vehicle. The film-forming agent may be a synthetic or natural resin or like material, including various polymeric products, natural rubber and indeed any substance which is capable of dispersion as a suspension or emulsion in water and which after application to a desired surface will form a coherent film or coating on such surface upon evaporation of the water. In some such compositions, such as those embodying acrylic ester resins, where the suspended film-forming agent may be regarded as essentially in solid form, the dispersion can be designated a latex, whereas other materials involve a liquid agent or liquid-carried agent, correspondingly definable as an emulsion in water. A water emulsion of an alkyd resin in an organic solvent is an example of the latter type.

Other instances of so-called latex compositions are water dispersions of styrene-butadiene resin and water dispersions of vinyl acetate resin, each of these being polymeric material and each being present as the dispersed phase in the latex. Latices and emulsions of these and other kinds are widely available and have heretofore been used, e.g. with non-metallic pigments, for the preparation of paints or other complete coating materials having the desirable aqueous characteristics described above. The present invention is designed for incorporation of aluminum pigment in any such base composition, whether regarded as of latex or emulsion type or as of some combined, intermediate or other kind, where there is an aqueous dispersion of water-insoluble film-forming material. Other substances, pigments or coloring material may of course be included, when and if corresponding characteristics are desired.

The resulting aluminum-pigmented coating materials are applicable to various uses, and may be made to have characteristics specially appropriate for specific purposes, as will become readily apparent to those familiar with the art. Thus metallic paints of different types may be prepared, suitable for indoor or exterior work. Another important type of use is in coating paper or like material, i.e. to provide a bright metallic surface, preferably one which can receive printing with special or conventional inks. Coating materials prepared according to the invention are suitable for application to paper and the like by special techniques such as so-called knife coatings, while corresponding coatings in the nature of paint or the like are appropriate to be applied to wood, metal, masonry or other surfaces by usual operations such as brushing, spraying, hand-roller coating, or the like.

Although a presently common form of aluminum pigment paste is one where the aluminum powder is circumstanced to have a so-called leafing property, the present invention is applicable to both leafing and non-leafing pigments, and indeed represents valuable improvement, in providing aluminum-containing water-base compositions that yield an effectively water-resistant coating, regardless of the type of pigment used and regardless of actual achievement of leafing. Thus even where the composition or its use may be such that leafing does not occur, or is incomplete (despite the employment of a so-called leafing pigment in some cases), there is effective realization of highly important characteristics of aluminum-pigmented coatings, as to protection, covering power and the like.

On the other hand, compositions can be produced in accordance with the invention, to have good leafing action under a number of conditions of use, in contrast to a failure of leafing in at least some prior attempts to put aluminum pigment in water-dispersion coating materials. It will be understood that leafing action in an applied coating means that the individual flake-like particles of aluminum metal tend to rise to or near the outer surface of the film, lying essentially flatwise in such surface and there leafing together, whereby the finished coating appears as an essentially continuous bright metal surface.

For instance, when the compositions of Examples 2, 3, 4, 5 and 7 below (with so-called latex-type bases) are applied to absorbing surfaces such as wood or paper, good leafing and brightness are obtained. For effective leafing of coatings on non-absorbing surfaces (such as many metal surfaces), it appears at present to be preferable that most or all of the resin binder, i.e. the film-forming agent, be carried in the oil phase of the oil-in-water emulsion established for dispersion of the aluminum pigment, rather than that such agent be constituted in a latex component as in the above-mentioned examples. Under such conditions and also preferably with somewhat larger proportions of aluminum pigment, satisfactory leafing has been obtained in coatings applied to metal or other non-absorbent surfaces.

It will also be appreciated that the invention is applicable to various grades of aluminum powders, whether of a mesh size (i.e. as passing through a screen of given mesh) conventionally employed for paints or similar coatings, or of finer mesh requirement as used for special purposes such as inks. The term aluminum pigment is generally employed herein to mean a metal powder product wherein the particles are essentially in flake form, suitable for use as pigment in coatings.

The usual paste form of such pigment is a mixture of the metal powder with mineral spirits or similar hydrocarbon solvent as defined below. For instance, a conventional aluminum pigment paste contains from 65% to 80% aluminum flake powder and from 20% to 35% mineral spirits, the percentage of the latter being slightly decreased to allow for the fatty acid content where such material is present. Thus the paste products commonly designated as leafing pigments and made by procedure which includes milling the aluminum powder in the presence of a selected fatty acid such as stearic acid, usually contain from 1% to 4% of the latter compound. The present invention, as explained above, extends to non-leafing coating compositions as well as to those which have leafing action; for instance, the aluminum pigment itself may be of non-leafing type (as known in the art), or in some cases the conditions of use may keep a leafing pigment from exhibiting such property.

Although the invention, in an important aspect, resides in the completed coating compositions, a further branch of the invention is concerned with new aluminum pastes or similar preparations, which contain added agents as described hereinbelow and which are capable of admixture with water-dispersed coating bases, to constitute finished preparations. Such novel pigment compositions are appropriate as articles of commerce in the same way as metal pigment pastes at the present time, e.g. for sale to manufacturers or ultimate users of metal paints or other coating compositions, to make up such paint or composition by admixture of the pigment preparation to an appropriate paint or other base. Thus, for example, a preparation comprising flake metal powder, as produced by milling with a fatty acid, and as admixed with a hydrocarbon solvent, may have incorporated therewith the above-described surface-active agent and also, if desired, the coupling agent. Such preparation, in the nature of a modified metal pigment paste, can be sold for incorporation with water base coating materials, to make up the final composition for use in coating work.

The improved procedure for incorporating metal pigment in water-dispersed coating compositions may conveniently embody a series of steps, starting, for example, with an aluminum pigment paste of the type described above. Such paste may consist of aluminum particles coated with stearic acid and mixed with mineral spirits.

The process may first comprise the preparation of a modified paste. That is to say, the paste is modified by mixing with it the appropriate surface-active agent and very preferably, further hydrocarbon solvent. The surface-active agent should be one which is oil-soluble and substantially water-insoluble, e.g. having a water solubility of not more than about 2%, but having certain characteristics of water compatability, specifically such that a dilute solution in mineral spirits or the like exhibits a low surface tension relative to water. The additional hydrocarbon solvent serves to extend or reduce the pigment paste, or more generally to thin it, so that it has greater fluidity and is more readily combined into the water-dispersed composition and so that there is more effective establishment of an emulsion for suspending the metal particles in or with the dispersed oil (hydrocarbon solvent) droplets. As indicated the modified paste can constitute an article of commerce, having ready adaptability for incorporation in final coating compositions. When the modified paste includes the further hydrocarbon solvent it is sometimes described hereinbelow as a "reduced paste."

A further ingredient is the so-called coupling agent, for instance a material of the class of alcohols and the like, which is miscible in both water and oil. Such coupling agents are well known in the emulsion art and are characterized by this mutual solubility in the water and oil phases of the emulsions. If desired, the coupling agent may be included in the so-called reduced paste, thus affording a more complete preparation, leaving a minimum of separate ingredients to be added by the coating manufacturer or user in making up the final composition. The coupling agent should be relatively volatile as explained below.

The final step in the process involves mixing the reduced paste with the water-dispersed coating resin or other agent. If not already incorporated, the coupling agent is added at this time. The coating or film-forming agent itself is conventionally supplied as a latex or emulsion, and such material is mixed with the reduced paste, preferably after some additional water has been added to the latter as well as the coupling agent. The ammonia material is also incorporated, conveniently by addition to the aqueous vehicle, e.g. in the above case the latex or emulsion of the film-forming agent, before such vehicle is combined with the reduced paste. The final mixture, including the resin latex or the like, is thoroughly stirred or otherwise mechanically treated to achieve uniform combination and effective emulsification of the oil content. The result is an aluminum powder coating composition of water-carried latex base or emulsion base type.

It has been found that the relatively insoluble surface-active agent, the coupling agent and the volatile base soap resulting from combination of the ammonia material with the fatty acid, coact in an unusual way to afford the oil-in-water type of emulsion, with the aluminum pigment thoroughly dispersed, the attendant advantages being the production of a highly satisfactory dispersion of aluminum pigment in paints or the like of this type, while retaining the aqueous character of the composition and yet affording a product which when applied has good water-proof or water resistant properties and good physical characteristics such as high scuff resistance or other consequences of the effective retention of the metal particles. The mutual functioning of these ingredients has been abundantly demonstrated by test, especially in their cooperation to afford the desired oil-in-water emulsion.

As indicated, the surface-active agent should be selected as one which has oil solubility, which has a maximum water solubility of about 2% and usually not more than about 1%, and which has surface tension characteristics such that a 0.1% solution of the agent in mineral spirits will exhibit an interfacial tension no greater than about 12 dynes per centimeter against water. Most preferably the agent may have a very low water solubility, e.g. about 0.01%.

Important examples of surface-active substances which constitute effective dispersing agents for the aluminum pigments in the present compositions, are the substantially water-insoluble oxazolines. Specifically these are substituted 2-oxazoline compounds, a presently preferred class thereof having the following structural formula:

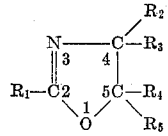

where $R_1$ is a substituent selected from the class consisting of alkyl and alkenyl groups, having from 12 to 22 carbon atoms, inclusive; and where each of $R_2$, $R_3$, $R_4$ and $R_5$ is selected from the class consisting of hydrogen and alkyl and hydroxy alkyl groups, containing from 1 to 5 carbon atoms, inclusive, at least one of said substituents $R_2$ to $R_5$ being a hydroxy alkyl group of the character stated.

Another kind of surface-active agent which can be used is a substituted 2-imidazoline. A presently preferred class of such compounds has the following formula:

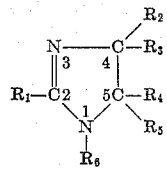

wherein $R_1$ is selected from the class consisting of alkyl and alkenyl groups having 12 to 22 carbon atoms, inclusive; wherein each of $R_2$, $R_3$, $R_4$ and $R_5$ is selected from the class consisting of hydrogen and alkyl groups containing 1 to 5 carbon atoms, inclusive; and wherein $R_6$ is a hydroxy alkyl group containing from 1 to 5 carbon atoms, inclusive.

A third type of surface-active agent likewise useful in the invention is a substituted 2-triazole, preferably a substance of the class of substituted 5-amino-4,1,2-triazoles, having the following formula:

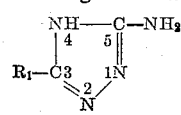

wherein $R_1$ is selected from the class consisting of alkyl and alkenyl groups, having from 12 to 22 carbon atoms, inclusive.

Generically the above-named compounds, appropriate as surface-active agents of the type required for the invention, may be defined as heterocyclic tertiary nitrogen compounds having an alkyl or alkenyl substituent on the ring which contains 12 to 22 carbon atoms, and also having at least one polar group as an additional substituent on the ring, with the remaining substituent positions occupied by hydrogen or low molecular weight alkyl groups with 1 to 5 carbon atoms. Examples of an appropriate polar group are an amino group or a hydroxy alkyl group having from 1 to 5 carbon atoms. Thus briefly, such a compound is one having a heterocyclic tertiary nitrogen ring, it being at present understood that the principal, significant substituents are the long chain group and the polar group, the first of these conferring the desired oil solubility, and the second providing the water compatibility, i.e. as represented by a low interfacial tension of the oil solution with water, while substantial water solubility is avoided. It will be understood that references to solubility in oil mean solubility in hydrocarbon solvents, for example of the types elsewhere identified herein.

Compounds of the classes identified above are known and can be prepared by procedure described in the prior art. For instance, suitable agents of the oxazoline class are produced by reacting a suitable amino-hydroxy compound with an appropriate fatty acid in approximately equimolar proportions, more specifically by reacting a beta-amino alcohol with a fatty acid, i.e. a fatty acid wherein the alkyl or alkenyl chain represents the desired substituent $R_1$. Thus a substance called Alkaterge C, further identified hereinbelow, is understood to be derived by reaction of oleic acid and 2-amino-2-methyl-1,3-pentanediol.

These substances have been found highly effective and economical for the defined purposes in providing dispersion of aluminum pigment in water-base coating compositions. Indeed a specific feature of invention resides in the employment of heterocyclic tertiary nitrogen compounds of the stated character, in amount from about 2% to about 25% by weight based on the weight of aluminum present in the aluminum pigment material, for coaction with the other ingredients in achieving the desired coating compositions.

Some examples of surface-active agents that are suitable are as follows, each agent being given with a trade name for convenient identification in further mention below.

A water-insoluble oxazoline has been mentioned above as Alkaterge C. This compound is identified as being 2 - oleyl - 4-methyl-4-hydroxymethyl-5-ethyl-2-oxazoline. Tests showed that the interfacial tension of 0.1% solution in mineral spirits, against water was 8.5 dynes. The structural formula of this compound is understood to be:

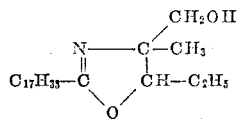

Another suitable oxazoline of water-insoluble character is the substance identified as 2-oleyl-4,4-dihydroxymethyl-2-oxazoline, produced by reacting tri-(hydroxymethyl)-aminomethane with oleic acid. This compound has surface tension characteristics well within the range indicated above and is effective in the present invention. Its structural formula is understood to be:

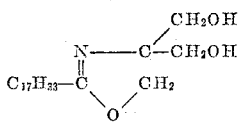

The product known as Alkaterge T, which is a water-insoluble oxazoline of the defined class and appears to be at least very closely similar, chemically, to the compound just mentioned, was also found quite suitable. It exhibited an interfacial tension of 1.5 dynes for a 0.1% solution in mineral spirits, against water. It and Alkaterge C, above, are marketed by Commercial Solvents Corporation, as likewise another suitable product, Alkaterge O, which is understood to comprise a substituted 2-oxazoline.

A further example of a surface-active agent effective in the present invention is called Agent 3577 Base, which is representative of the above-mentioned class of triazoles. The specific compound is 3-oleyl-5-amino-4,1,2-triazole. Tests revealed that the interfacial tension of 0.1% solution in mineral spirits, against water was 2.4 dynes. The structural formula is understood to be:

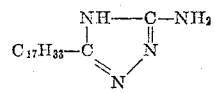

As examples of an imidazoline appropriate for the invention, there may be mentioned the products known as Nopcochex Concentrate, Nalcamine G-13, Amine 220, and Amine S Base. Each of these, which on the above tests, showed an interfacial tension of less than 1.0 dyne, is identified as 1 (2-hydroxymethyl) -2-oleyl-2-imidazoline, and is understood to have the following structural formula:

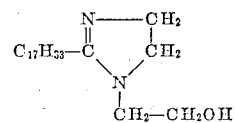

As stated, ammonia material is important in the mixture of the ultimate coating composition, its function being understood as forming a volatile base soap with the fatty acid or fatty acids that are present in the metallic paste, e.g. remaining from use in the milling operation. Fatty acids are used as lubricants in such operations, and as known, certain fatty acids, for instance when coated on the metal particles during milling, cooperate in providing leafing characteristics. If the metal powder or paste is free of fatty acid, a fatty acid should be added in preparing the present coating compositions, preferably by adding such fatty acid to the metal powder or paste prior to the ultimate mixture with the water-dispersed coating resin preparation or the like. Indeed in at least some cases it appears advantageous to add further fatty acid to metal paste which already includes a certain proportion of such compound. For the purpose of providing the volatile base soap in aid of emulsification or dispersion pursuant to the present invention, suitable fatty acids, however incorporated or added, include alkyl and alkenyl fatty acids having from 14 to 22 carbon atoms in the alkyl or alkenyl chain. Specific examples are: stearic acid which is now most commonly used in preparing aluminum pastes, and also substances such as oleic, lauric, myristic, behenic, palmitic and ricinoleic acids. Conveniently, the total fatty acid in the composition may be in the range of about 1% to about 10% by weight, based on the weight of aluminum metal present in the aluminum pigment employed.

The ammonia material may be supplied in the simplest form of ammonia, viz. ammonium hydroxide, or as an ammonia derivative which is water-soluble and which, after formation of the salt of the fatty acid, will volatilize so as to restore the acid. Thus as alternatives to ammonia per se, ammonia derivatives may be employed having the stated characteristics; a specifically useful substance, from the consideration of cost and absence of objectionable odor or toxicity, is morpholine. All such compounds, e.g. ammonium hydroxide, morpholine, methyl amine and the like, can be classed as ammonia material or ammonia-derived bases. In general, the ammonia material should be of such nature and should be added in such amount, as to provide a pH of at least about 9 in the complete composition, since it appears that a pH of that value or greater is usually necessary to enable the soap to be formed. As indicated, the effect of the ammonia inclusion is to promote emulsification (presumably by forming the stated water-soluble soap or salt). After application of a coating and as the coating dries, the ammonia or morpholine evaporates so that the fatty acid returns to its original, relatively insoluble state.

The coupling agent is, as explained, a substance having solubility in both water and oil. For coating compositions of the character to which this invention is primarily directed, the coupling agent should be an organic liquid selected from the class consisting of alcohols, glycols, glycol-ethers and glycol-diethers, specifically an agent so selected which distils below 200° C. at 760 mm. pressure and which exhibits a vapor pressure of 0.01 mm. or more at 20° C., and further, which is miscible (i.e. in all proportions) with both water and hydrocarbon solvents. As given in the foregoing class, the term "alcohol" is understood to mean a monohydric alcohol, the reference to alcohols and glycols being thus alternatively definable as monohydric and dihydric alcohols. A presently preferred example of a coupling agent is ethylene glycol monobutyl ether (called Butyl Cellosolve). An instance of a high volatility material is isopropyl alcohol having a boiling point of 80.4° C. and a vapor pressure of 40 mm. at 20° C. A low volatility agent is hexylene glycol having a boiling point of 197.1° C. and a vapor pressure of 0.02 mm. at 20° C. Other satisfactory agents are diethylene glycol monoethyl ether, diethylene glycol diethyl ether, diacetone alcohol, and tertiary butyl alcohol, all being liquids adapted to evaporate when an applied coating of the new composition dries. In general it appears that the coupling agents should be used in the amount of about 5% to about 15% based on the total water content of the final coating composition, indications being that stability tends to be impaired with smaller quantities than 5% while amounts substantially above 15% tend to affect the dispersion of the film-forming agent, i.e. to impair the latex or emulsion structure.

An oil base is present, as explained above, in the compositions of the invention, being at least there by reason of its presence in a conventional metal pigment paste. A special feature of the invention, however, is the addition of such oil base to the metal powder or paste, e.g. to prepare the so-called reduced paste. Any of a large number of oil phases can be employed, specifically a large variety of hydrocarbon solvents. The selection of a suitable oil base of this type does not appear to involve critical requirements, but rather a choice among many known liquid solvents, to suit such factors as toxicity, cost and convenience in the preparation of a specific coating composition. It is at present preferred to use coal tar solvent naphtha, e.g. as identified by U.S. Military Specification MIL-N-15178A. Other hydrocarbon solvents that can be employed are mineral spirits (also known as petroleum spirits), spirits of turpentine, toluene (e.g. industrial grade as used in paints and varnishes), xylene (industrial grade, so-called solvent naphtha, as used in paints and varnishes), petroleum aliphatic naphtha, petroleum aromatic naphtha, and other grades of xylene. In some cases, the hydrocarbon solvent may contain resin material dissolved therein, e.g. as an extender or auxiliary binder, or indeed as the sole film-forming agent, to be dispersed in the aqueous medium by emulsification of the oil (hydrocarbon) base. In all cases the solvent serves as a thinner or diluent, giving the metal paste greater fluidity, and of course, constitutes the oil phase of the desired oil-in-water emulsion.

An appropriate amount of the coupling agent is, for example, about 5 parts of such agent to 1 part of the water-insoluble surface-active agent (by weight), while a suitable total quantity of hydrocarbon solvent (including that present in the original aluminum paste) is about 2 parts by weight for 1 part by weight of the metal (aluminum) in the paste; these proportions may vary, to suit requirements.

The following examples, which are given by way of illustration, indicate the manner in which the invention may advantageously be practised, the parts in each case being parts by weight:

*Example 1*

Preparation of aluminum pigment composition:

A leafing aluminum pigment paste was employed, being a paste prepared as described above by milling with stearic acid and being of the type marketed by Aluminum Company of Canada, Limited, under the trade designation Alpaste 300-N, the composition being aluminum 68%, stearic acid 2% and mineral spirits 30%. 100 parts of this aluminum paste were thoroughly mixed with 10 parts by weight of Alkaterge T. The resulting, modified paste is useful in making up the coating compositions of the invention and is referred to in certain following examples as "unreduced paste." It will be understood that other surface-active agents, having the characteristics described above, can be employed instead of the specified substituted oxazoline, for preparing unreduced paste.

*Example 2*

110 parts of the unreduced paste prepared in accordance with Example 1 were mixed with 25 parts of an alicyclic ketone resin dissolved in 75 parts of coal tar solvent naphtha, a suitable resin for this purpose being a product designated resin MS2, further identified below. Used thus as a supplemental binder, this resin material in the hydrocarbon solvent is optional, but if used may be any of various substances, including styrenated alkyl resins. The composition now prepared can be called a "reduced paste."

A latex vehicle was then prepared as follows: To 5 parts of sodium polyacrylate solution, being a 15% solution of such substance in water, e.g. such as the solution designated Polyco 296-BT, made by the Borden Company, were added about 2 parts of 28% ammonium hydroxide solution, the amount of ammonia being sufficient to keep the composition alkaline, i.e. at a pH of at least 9, and thus to form the ammonium stearate with the stearic acid of the aluminum paste. 200 parts of water were added and 50 parts of ethylene glycol-monobutyl ether as a coupling agent. Finally 160 parts of a polyvinyl acetate latex were added and combined, the latex being known as Polyco 678, made by the Borden Company.

A finished paint was then prepared by adding the latex vehicle to the reduced paste while stirring. The resulting latex base aluminum paint, applied on absorbent surfaces (e.g. wood panels, used also in testing Examples 3 to 5 and 7, below), showed good brightness, water-proofness and scuff resistance.

The sodium polyacrylate is an optional ingredient added to increase the viscosity of the latex vehicle; among other thickening agents which may be used are substances such as methylcellulose and ammoniacal casein.

*Example 3*

33 parts of unreduced paste prepared according to Example 1 but using Alkaterge C (in like amount) instead of Alkaterge T, were combined with 6 parts of isopropyl alcohol as a coupling agent. To the resulting mixture were added 20 parts of water and about 1 part of 28% ammonium hydroxide. The whole was then combined with 120 parts of acrylic acid latex, i.e. the emulsion polymer of an acrylic acid ester, being specifically an acrylic acid ester resin latex called Rhoplex AC-33 manufactured by Rohm and Haas Company.

The resulting latex base aluminum paint exhibited the water-proof and scuff-resistant characteristics of the invention. It will be noted that no additional hydrocarbon solvent was used in this example, the oil base being the solvent present in the original aluminum paste.

*Example 4*

A reduced paste was prepared by adding 70 parts of coal tar solvent naphtha to 110 parts of the unreduced paste prepared in accordance with Example 1.

A latex vehicle was then prepared as follows:

5 parts of the above sodium polyacrylate solution (Polyco 296-BT) were mixed with about 1 part of ammonium hydroxide (28% solution), to maintain the desired alkalinity, and were added to 200 parts of water in which 50 parts of isopropyl alcohol were added as a coupling agent. The whole was then combined with 120 parts of the above-mentioned acrylic acid ester latex (Rhoplex AC-33). A paint was then prepared by adding the latex vehicle to the reduced paste while stirring.

*Example 5*

A reduced paste was prepared by combining 110 parts of the unreduced paste of Example 1 with 120 parts of coal tar solvent naphtha and 40 parts of a coumarone-indene resin (such as the product designated Cumar V3, marketed by the Barrett Company of Montreal), the latter resin serving in similar fashion to the alicyclic ketone resin of Example 2, and thus being an optional ingredient which acts as a supplemental extender and as an auxiliary binder.

A latex vehicle was then prepared by first adding 5 parts of the polyacrylate solution (Polyco 296-BT) to 300 parts of water with 2 parts of 28% ammonium hydroxide. 50 parts of ethylene glycol monobutyl ether were then added as a coupling agent, and the whole was combined with 160 parts of the acrylic acid ester latex (Rhoplex AC-33). A finished paint was then prepared by adding the latex vehicle to the reduced paste while stirring. Specifically, in this as in other examples above, the latex vehicle is conveniently added to the paste in small increments, with thorough stirring after each addition. Test panels were painted with the final compositions produced in Examples 2 to 5 inclusive, and the resulting coatings showed free leafing of the aluminum flake and bright finishes, with excellent water and scuff resistance.

*Example 6*

In this instance an aluminum paste pigment was first prepared by milling aluminum powder without any fatty acid, i.e. in the absence of stearic acid or any other milling lubricant or leafing agent. Thus a fatty acid-free paste pigment was produced, having a composition consisting of aluminum flake 71.3% and mineral spirits 28.7%.

This special paste was first converted to a reduced paste by mixing 100 parts of the special paste with 10 parts of Alkaterge T, 3.2 parts of stearic acid, and 80 parts of coal tar solvent naphtha.

A latex vehicle was then prepared, consisting of 4 parts of the polyacrylate (Polyco 296-BT), 3 parts of ammonium hydroxide (28% solution in water), 320 parts of water, 40 parts of hexylene glycol (as coupling agent) and 128 parts of the acrylic acid ester resin latex (Rhoplex AC-33). The reduced paste and the latex vehicle were combined as in the preceding examples. The resulting coating composition, as also in the other examples, comprised a satisfactory oil-in-water emulsion, realizing the full advantages of the invention. This example indicates that the results are equally effective when the fatty acid is added separately, rather than by original incorporation in the milling of the aluminum powder.

For comparison, tests were run with the same ingredients and preparation procedure as in this Example 6, but omitting various different ingredients. Thus when the stearic acid was omitted, the final coating composition was a water-in-oil emulsion, the desired oil-in-water condition being unobtainable, presumably because of the absence of the ammonium soap. When both stearic acid and the coupling agent were omitted, the result was again merely a water-in-oil emulsion, and likewise when the only omission from Example 6 was the coupling agent. When the surface-active agent (Alkaterge T) was omitted, no emulsion at all could be obtained in the final mixture, whether or not the stearic acid was added in the amount specified in Example 6.

*Example 7*

For this example a normal aluminum pigment paste was employed, specifically a product known as Alpaste 310, for which the aluminum powder had been milled in the presence of stearic acid, and which had approximately the following composition: aluminum flake 80%, stearic acid 1.5%, and mineral spirits 28.5%. A preliminary, modified but essentially unreduced paste was first prepared, consisting of a mixture of 45 parts of Alpaste 310, 5 parts of Alkaterge T, 5 parts of coal tar solvent naphtha and 0.25 part of stearic acid. A so-called reduced paste was then prepared by mixing 125 parts of the unreduced paste (just described) with 2 parts of stearic acid and 100 parts of coal tar solvent naphtha.

A latex vehicle was prepared containing 5 parts of the polyacrylate solution (Polyco 296-BT), 3 parts of the 28% ammonium hydroxide solution, 400 parts of water, 50 parts of hexylene glycol and 160 parts of the acrylic acid ester latex (Rhoplex AC-33). Upon appropriately combining the reduced paste with the latex vehicle (as in the other examples) a satisfactory coating composition was achieved, being an oil-in-water emulsion with the aluminum powder effectively dispersed.

Tests were also made using a generally similar formulation (employing the same Alpaste 310) but omitting the surface-active agent (Alkaterge) and at the same time increasing the amount of stearic acid, i.e. to a point where 12 parts of the latter were included for 90 parts of Alpaste 310. No emulsion whatever was obtained in the final mixture with the latex vehicle. When a similar test was run wherein most of the added stearic acid was replaced by oleic acid (e.g. 2 parts of stearic acid and 10 parts of oleic acid for 90 parts of Alpaste 310), the final mixture with the latex vehicle produced a water-in-oil emulsion, but did not achieve the desired oil-in-water condition. This last test indicates that when the water-insoluble surface-active agent is replaced, in effect, with oleic acid, the desired results are not obtained, although more emulsifying action is achieved than in the case where such replacement was attempted with stearic acid. In both of these further tests (omitting the surface-active agent) the amount of ammonia was somewhat increased, to insure adequacy of formation of an ammonium soap with the larger quantities of fatty acid, but as just explained, the desired emulsion structure was not achieved.

*Example 8*

In this instance the aqueous dispersion of the film forming agent was constituted directly by the pigment-dispersing emulsion of the oil phase, the agent being carried in such phase.

The same preliminary, modified, aluminum pigment paste was first prepared as in Example 7 above, including Alkaterge T as the surface-active agent. Measured in parts by weight (as elsewhere herein), a reduced paste was made, containing 300 parts of the modified paste, 5 parts of oleic acid, 150 parts of MS2 resin solution (50% in xylol), 150 parts of spar varnish (U.S. Federal Specification TT-V-119) and 120 parts of coal tar solvent naphtha. Resin MS2 is an alicyclic ketone resin marketed by Howards and Sons (Canada) Ltd., of Cornwall, Ontario, Canada, and is understood to be the same as a resin AW2 which is described in the following publication: British Intelligence Objectives Sub-Committee, Final Report No. 629, Item 22, "Investigation of Synthetic Resins Used in the German Surface Coating Industry," pp. 101-102, by S. R. W. Martin, J. D. Morgan and G. Weatherston, March-April 1946, published by B.I.O.S., 32 Bryanston Sq., London, W.1, England.

The water vehicle here consisted simply of 5 parts of NH$_4$OH (28% solution), 700 parts of water and 75 parts of ethylene glycol monobutyl ether (as coupling agent), and the final coating composition was obtained by mixing the 780 parts of tthe aqueous vehicle with the above 730 parts of so-called reduced paste, sufficiently thoroughly to obtain the desired emulsion. Thus in making the product the film-forming material, as contained in the resin solution and the spar varnish, is in effect dissolved in or carried by the hydrocarbon solvent, so that in this example the aqueous dispersion of such material is the oil-in-water emulsion established (to carry the aluminum pigment) in accordance with the invention. This composition exhibited good leafing action (and corresponding good brightness) of the aluminum upon application to non-absorbing metal surfaces, as well as on absorbing surfaces.

As indicated, the procedure and compositions of the invention are adapted for incorporating aluminum pigments with a wide variety of water-dispersed film-forming agents. Thus other examples of such agents are: a styrene-butadiene resin latex (such as Dow 512–K, made by Dow Chemical Company), a polyvinyl acetate latex (such as Bakelite WC–130), and an emulsifiable alkyd resin (such as Synthemul 1504, made by Reichhold Chemicals, Inc.).

In all of the desired coating compositions according to the invention, the final structure comprises an oil-in-water emulsion. In the course of adding the aqueous vehicle (which may comprise a latex, as in certain examples) to the reduced paste in small increments, a water-in-oil emulsion may first appear, but as further vehicle is added, the change to the desired type of emulsion occurs.

On application of the coating composition, as paint or otherwise, to a substrate, the water evaporates or is drawn into the pores of a porous substrate such as wood or paper. Such reduction of the water content concentrates the emulsion-suspension to a point where it breaks, possibly by first inverting to the water-in-oil type; in at least some cases, it appears that the organic solvents also then become free to act on the particles of resin in the latex (or other film-forming agent), apparently swelling and dissolving the surface layers of such particles, whereby they adhere strongly to each other and to the particles of aluminum flake in the coating. In any case, all the water and organic solvents ultimately evaporate, and the ammonium stearate or equivalent volatile-base soap, such as formed by reaction of the ammonia material (e.g. ammonium hydroxide) with the stearic acid or other fatty acid present, breaks down with escape of ammonia, leaving the fatty acid in essentially insoluble condition.

The final dried coatings exhibit excellent smudge resistance, in a fashion much superior to conventional oleoresinous aluminum paints. The coatings have excellent scuff resistance because of the adhesive action which the resin particles or the like (which in some cases can be apparently described as solvated in the manner explained above) have for the metal flake. The coatings also have excellent resistance to washing, since they are relatively free from water-soluble agents and since the films have a tightly coherent structure, for instance as arising because of the apparent solvation of the acrylic resin or like particles. Indeed in many cases air-dried films laid down from the paints produced in the above examples are sufficiently water-proof to withstand washing with soap and water within one hour after application.

It appears that the procedures and combinations of agents set forth above as relating to the invention of new aluminum pigment pastes and coating compositions, are applicable to other metallic pigments, for example flake powders made of various metals such as copper, brass, nickel, stainless steel, iron, chromium or the like, and that by the cooperating function of the defined surface-active agents and coupling agents, e.g. with an oil base and an ammonia-derived salt of a fatty acid, such other metal pigments may be effectively incorporated in aqueous-base coating compositions, the final composition in each case comprising an oil-in-water emulsion and representing an appropriate dispersion of a film-forming agent.

As used herein the term metallic pigment means pigment of finely divided metal, and aluminum pigment means pigment of finely divided aluminum metal.

This application is a continuation-in-part of my copending application Serial No. 635,979, filed January 24, 1957 for Method of Incorporating Metallic Pigments in Emulsion Type Coating Compositions and Compositions Thus Produced, now abandoned in favor of the present application.

It is to be understood that the invention is not limited to the specific operations and formulas herein described, but may be embodied in other ways and forms without departure from its spirit.

I claim:

1. A coating composition of water-dispersed material, comprising water, a film-forming agent in dispersed form relative to the water, said film-forming agent being adapted to provide a lasting, coherent coating on a surface to which the composition is applied, aluminum pigment, hydrocarbon solvent and material maintaining said solvent and said water as an oil-in-water emulsion with the aluminum pigment dispersed therein, said last-mentioned material being adapted, upon drying of an applied coating of the composition, to leave substantially only water-insoluble substances in the dried coating, and said last-mentioned material comprising an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent which consists of a liquid organic solvent that is miscible in both water and hydrocarbon solvents and that is adapted to evaporate upon said drying of said applied coating, and auxiliary emulsifying material constituted by a fatty acid and a volatile base that contains ammonia nitrogen.

2. A coating composition of water-dispersed material, comprising water, a film-forming agent in dispersed form relative to the water, said film-forming agent being adapted to provide a lasting, coherent coating on a surface to which the composition is applied, aluminum pigment, hydrocarbon solvent, and material maintaining said solvent and said water as an oil-in-water emulsion with the aluminum pigment dispersed therein, said last-mentioned material comprising an oil-soluble surface-active agent, consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent which consists of a liquid organic solvent that is miscible in both water and hydrocarbon solvents and that has a boiling point below about 200° C. at 760 mm. pressure and a vapor pressure of at least about 0.01 mm. at 20° C., and auxiliary emulsifying material comprising a fatty acid selected from the class of alkyl and alkylene fatty acids containing from 14 to 22 carbon atoms, and ammonia material reacting with said selected fatty acid to produce a fatty acid salt of a volatile base.

3. A coating composition of water-dispersed material, comprising water, a film-forming agent in dispersed form relative to the water, said film-forming agent being adapted to provide a lasting, coherent coating on a surface to which the composition is applied, aluminum flake pigment, hydrocarbon solvent and material maintaining said solvent and said water as an oil-in-water emulsion with the aluminum pigment dispersed therein, said last-mentioned material comprising an oil-soluble surface-active agent, consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent which consists of a liquid organic solvent that is miscible in both water and hydrocarbon solvents and that is adapted to evaporate upon drying of an applied coating of the composition, and an auxiliary emulsifying agent comprising a fatty acid salt of a volatile base, said volatile base containing ammonia nitrogen and said fatty acid being selected from the class of alkyl and alkylene fatty acids containing from 14 to 22 carbon atoms, said water, said hydrocarbon solvent and said coupling agent evaporating, and said volatile base of the fatty acid salt volatilizing, upon drying of the coating composition after application thereof.

4. A coating composition of water-dispersed material, comprising water, a coating resin in dispersed form relative to the water, aluminum flake pigment, a hydrocarbon solvent and material maintaining said water and hydrocarbon solvent as an oil-in-water emulsion with the aluminum pigment dispersed therein, said material comprising a substantially water-insoluble oxazoline, a coupling agent miscible in both water and oil, and selected from the class consisting of monohydric alcohols, glycols, glycol-ethers and glycol-diethers, and ammonia sufficient to keep the composition alkaline.

5. A composition as defined in claim 4, wherein the aluminum pigment is a leafing pigment carrying stearic acid, and wherein the resin is carried by the hydrocarbon solvent and is dispersed relative to the water by said emulsion.

6. A composition as defined in claim 4, wherein the coating resin is dispersed in the water in the form of a latex.

7. A coating composition of water-dispersed material, comprising water, a resinous film-forming agent in dispersed form relative to the water, said film-forming agent being adapted to provide a lasting, coherent coating on a surface to which the composition is applied, aluminum flake pigment, hydrocarbon solvent and material maintaining said solvent and said water as an oil-in-water emulsion with the aluminum pigment dispersed therein, said last-mentioned material comprising an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent which consists of a liquid organic solvent that is miscible in both water and hydrocarbon solvents and that has a boiling point below about 200° C. at 760 mm. pressure and a vapor pressure of at least about 0.01 mm. at 20 ° C., and auxiliary emulsifying material constituted by a fatty acid and a volatile base which contains ammonia nitrogen and which one reaction with the fatty acid yields a fatty acid salt of said volatile base, said salt, upon drying of an applied coating of the composition, being reconverted to the fatty acid by volatilization of the base.

8. A coating composition of water-dispersed material, comprising water, a resinous film-forming agent in dispersed form relative to the water, said film-forming agent being adapted to provide a lasting, coherent coating on a surface to which the composition is applied, aluminum flake pigment, hydrocarbon solvent and material maintaining said solvent and said water as an oil-in-water emulsion with the aluminum pigment dispersed therein, said last-mentioned material comprising an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent miscible in both water and hydrocarbon solvents and adapted to evaporate upon drying of an applied coating of said coating composition, said coupling agent being selected from the class consisting of monohydric alcohols, glycols, glycol-ethers and glycol-diethers, and auxiliary emulsifying material comprising a fatty acid selected from the class of alkyl and alkylene fatty acids containing from 14 to 22 carbon atoms, and ammonia material reacting with said selected fatty acid to produce a fatty acid salt of a volatile base, said ammonia material being sufficient to provide a pH of at least about 9 in the coating composition.

9. A coating composition as defined in claim 8, wherein the surface-active agent is from about 2% to about 25% by weight, based on the aluminum of said pigment, of substituted 2-oxazoline.

10. A coating composition as defined in claim 8, wherein the surface-active agent is from about 2% to about 25% by weight, based on the aluminum of said pigment, of substituted 2-imidazoline.

11. A coating composition as defined in claim 8, wherein the surface-active agent is from about 2% to about 25% by weight, based on the aluminum of said pigment, of substituted 5-amino-4,1,2-triazole.

12. An aluminum pigment composition comprising aluminum pigment which has been milled in the presence of fatty acid and which carries said fatty acid with it, a hydrocarbon solvent, and an amount of at least about 2% by weight, based on the aluminum of said pigment, of an oil-soluble surface-active agent for promoting dispersion of said pigment and said solvent in the form of an oil-in-water emulsion upon incorporation of the composition in an aqueous medium, said surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms.

13. An aluminum pigment composition adapted for incorporation in a coating composition which comprises an aqueous dispersion of a film-forming agent, comprising aluminum pigment, a fatty acid selected from the class of alkyl and alkylene fatty acids containing from 14 to 22 carbon atoms, a hydrocarbon solvent, an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, and a coupling agent which consists of a liquid organic solvent that is miscible in both water and hydrocarbon solvents and that has a boiling point below about 200° C. at 760 mm. pressure and a vapor pressure of at least about 0.01 mm. at 20° C.

14. An aluminum pigment composition comprising aluminum pigment, a hydrocarbon solvent, and an amount of at least about 2% by weight, based on the aluminum of said pigment, of an oil-soluble surface-active agent for promoting dispersion of said pigment and said solvent upon incorporation of the composition in an aqueous medium, said agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms.

15. An aluminum pigment composition comprising aluminum pigment, a hydrocarbon solvent, and an oil-soluble surface-active agent for promoting dispersion of said pigment and said solvent upon incorporation of the composition in an aqueous medium, said agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, said composition also including a coupling agent to coact with the surface-active agent in effecting said dispersion of the pigment and solvent, said coupling agent having a boiling point below about 200° C. at 760 mm. pressure and a vapor pressure of at least about 0.01 mm. at 20° C., and being selected from the class consisting of monohydric alcohols, glycols, glycol-ethers and glycol-diethers.

16. An aluminum pigment composition as defined in claim 14, wherein the pigment comprises aluminum pigment which has been milled in the presence of fatty acid and which carries said fatty acid with it.

17. An aluminum pigment composition as defined in claim 13, wherein the surface-active agent is substituted 2-oxazoline in amount of about 2% to 25% by weight, based on the aluminum of said pigment, and which includes stearic acid in amount of about 1% to 10% by weight, based on the aluminum of said pigment.

18. An aluminum pigment composition comprising aluminum flake pigment, a hydrocarbon solvent, and from about 2% to about 25% by weight, based on the aluminum of said pigment, of an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms.

19. A coating composition of water-dispersed material which comprises the aluminum pigment composition defined in claim 18, water, material adapted to cooperate with said surface-active agent for establishing said hydrocarbon solvent and said water as an oil-in-water emulsion with the aluminum pigment dispersed therein, said last-mentioned material comprising a coupling agent miscible in both water and hydrocarbon solvents and adapted to evaporate upon drying of an applied coating of said coating composition, said coupling agent being selected from the class consisting of monohydric alcohols, glycols, glycol-ethers and glycol-diethers, and auxiliary emulsifying material constituted by a fatty acid and a volatile base which contains ammonia nitrogen and which on reaction with the fatty acid yields a fatty acid salt of said volatile base, and which is sufficient to provide a pH of at least about 9 in the coating composition, said salt, upon drying of an applied coating of the composition, being reconverted to the fatty acid by volatilization of the base, and substantially water-insoluble resinous film-forming material in dispersion in the coating composition, said film-forming material being adapted to provide a lasting coherent coating on a surface to which the composition is applied.

20. An aluminum pigment composition as defined in claim 18, wherein the surface-active agent is 2-oleyl-4-methyl-4-hydroxymethyl-5-ethyl-2-oxazoline.

21. An aluminum pigment composition as defined in claim 18, wherein the surface-active agent is 2-oleyl-4,4-dihydroxymethyl-2-oxazoline.

22. An aluminum pigment composition as defined in claim 18, wherein the surface-active agent is 1(2-hydroxymethyl)-2-oleyl-2-imidazoline.

23. A metallic pigment composition as defined in claim 18, wherein the surface-active agent is 3-oleyl-5-amino-4,1,2-triazole.

24. An aluminum pigment composition comprising aluminum pigment, a hydrocarbon solvent, and from about 2% to about 25% by weight, based on the aluminum of said pigment, of an oil-soluble surface-active agent consisting of substituted 2-oxazoline having water solubility not greater than about 2% and having a substituent at position 2 consisting of an aliphatic hydrocarbon residue having 12 to 22 carbon atoms and having another substituent consisting of a polar group.

25. A coating composition of water-dispersed material which comprises the aluminum pigment composition defined in claim 24, water and material adapted to cooperate with said surface active agent for establishing said hydrocarbon solvent and said water as an oil-in-water emulsion with the aluminum pigment dispersed therein, said last-mentioned material comprising a coupling agent miscible in both water and hydrocarbon solvents and adapted to evaporate upon drying of an applied coating of said coating composition, said coupling agent being selected from the class consisting of monohydric alcohols, glycols, glycol-ethers and glycol-diethers, and auxiliary emulsifying material constituted by a fatty acid having from 14 to 22 carbon atoms, and a volatile base selected from the class consisting of ammonia and morpholine, and sufficient to provide a pH of at least about 9 in the coating composition, and substantially water-insoluble film-forming material in dispersion in the coating composition, for binding the aluminum pigment in an applied coating of said coating composition upon evaporation of the water, hydrocarbon solvent and coupling agent.

26. A coating composition of water-dispersed material which comprises the aluminum pigment composition defined in claim 24, water, material adapted to cooperate with said surface-active agent for establishing said hydrocarbon solvent and said water as an oil-in-water emulsion with the aluminum pigment dispersed therein, said last-mentioned material comprising ethylene glycol monobutyl ether as a coupling agent, and an auxiliary emulsifying agent comprising stearic acid and ammonia material selected from the class consisting of ammonia and morpholine, and sufficient to provide a pH of at least about 9 in the coating composition, said ammonia material reacting with said stearic acid to produce a stearate of a volatile base, and substantially water-insoluble film-forming material in dispersion in the coating composition, for binding the aluminum pigment in an applied coating of said coating composition upon evaporation of the water, hydrocarbon solvent and coupling agent.

27. A method of producing a water-dispersion coating composition containing aluminum pigment, which method comprises establishing an oil-base mixture comprising aluminum pigment, a fatty acid, a hydrocarbon solvent and an oil-soluble surface-active agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, establishing a water-base mixture comprising water and a coupling agent which is miscible in both water and oil, said coupling agent being selected from the class consisting of monohydric alcohols, glycols, glycol-ethers and glycol-diethers, one of said mixtures carrying a substantially water-insoluble film-forming agent therein, said film-forming agent being adapted to provide a lasting, coherent coating on a surface to which the composition is applied, and mixing said mixtures together to produce a coating composition comprising an oil-in-water emulsion having the film-forming agent and the metal pigment dispersed therein.

28. A method as defined in claim 27 wherein the film-forming agent is carried in the hydrocarbon solvent, and wherein the water-base mixture comprises ammonia material selected from the class consisting of ammonia and morpholine, and capable of reacting with the fatty acid to produce a fatty acid salt of a volatile base in the coating composition.

29. A method as defined in claim 27 wherein the film-forming agent is carried in dispersion in the water-base mixture, and wherein the water-base mixture comprises ammonia material selected from the class consisting of ammonia and morpholine, and capable of reacting with the fatty acid to produce a fatty acid salt of a volatile base in the coating composition.

30. A metallic pigment composition comprising metallic pigment of flake metal powder, a hydrocarbon solvent, and an amount of at least about 2% by weight, based on the metal of said pigment, of an oil-soluble surface-active agent for promoting dispersion of said pigment and said solvent upon incorporation of the composition in an aqueous medium, said agent consisting of a heterocyclic tertiary nitrogen compound having a ring including at least one tertiary nitrogen atom at one position and having a plurality of substituents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms.

31. A coating composition of water-dispersed material, comprising water, a film-forming agent in dispersed form relative to the water, said film-forming agent being adapted to provide a lasting, coherent coating on a surface to which the composition is applied, a metallic pigment, hydrocarbon solvent and material maintaining said solvent and said water as an oil-in-water emulsion with the metal pigment dispersed therein, said last-mentioned material being adapted, upon drying of an applied coating of the composition, to leave substantially only water-insoluble substances in the dried coating, and said last-mentioned material comprising an oil-soluble surface-active agent consisting of a heterocyclic tertiary nitrogen compound having a ring including at least one tertiary nitrogen atom at one position and having a plurality of substitutents at other positions of the ring, one of said substituents being selected from the class consisting of alkyl and alkenyl groups having from 12 to 22 carbon atoms, at least one of all the other substituents on the ring being a polar group and each of the remainder of all said other substituents that are not polar groups being selected from the class consisting of hydrogen and alkyl groups having from 1 to 5 carbon atoms, a coupling agent which consists of a liquid organic solvent that is miscible in both water and hydrocarbon solvents and that is adapted to evaporate upon said drying of said applied coating, and auxiliary emulsifying material constituted by a fatty acid and a volatile base that contains ammonia nitrogen.

References Cited in the file of this patent

UNITED STATES PATENTS

| 2,185,194 | Harris | Jan. 2, 1940 |
| 2,587,266 | Wray et al. | Feb. 26, 1952 |
| 2,587,268 | Roberts | Feb. 26, 1952 |
| 2,773,041 | Larsen et al. | Dec. 4, 1956 |
| 2,839,482 | Geen et al. | June 17, 1958 |

OTHER REFERENCES

Speel: Textile Chemicals and Auxiliaries (2nd Edition), pp. 288–289, 401–402, Reinhold, 1957.